METHOD AND APPARATUS FOR THE TREATMENT OF LIQUIDS

Original Filed Sept. 22, 1966

Robert E. McMinn
Clifford C. Dougherty, Jr.
INVENTORS
JAMES F. WEILER
BY WILLIAM A. STOUT
DUDLEY R. DOBIE, JR.
HENRY W. HOPE
ATTORNEYS United States Patent Office Re. 27,210
Reissued Nov. 2, 1971

27,210
METHOD AND APPARATUS FOR THE TREATMENT OF LIQUIDS

Robert E. McMinn and Clifford C. Dougherty, Jr., Oklahoma City, Okla., assignors to Black, Sivalls & Bryson, Inc., Kansas City, Mo.

Original No. 3,396,512, dated Aug. 13, 1968, Ser. No. 581,367, Sept. 22, 1966. Application for reissue Jan. 12, 1970, Ser. No. 2,072
Int. Cl. B01d *53/14*
U.S. Cl. 55—170 7 Claims

Matter enclosed in heavy brackets [ ] appears in the original patent but forms no part of this reissue specification; matter printed in italics indicates the additions made by reissue.

ABSTRACT OF THE DISCLOSURE

The present invention is directed to a method and apparatus for the treatment of liquids, and more particularly, to method and apparatus used in the separation of liquids of differing densities and of gases also contained therein. The present invention utilizes a vessel having compartments containing heating means, filtration means, and conveying means, all designed to continue the coalescence and separation. To this end, conveying ducts having a large cross-sectional area are used, which ducts terminate below maintained liquid levels.

Figure 1:
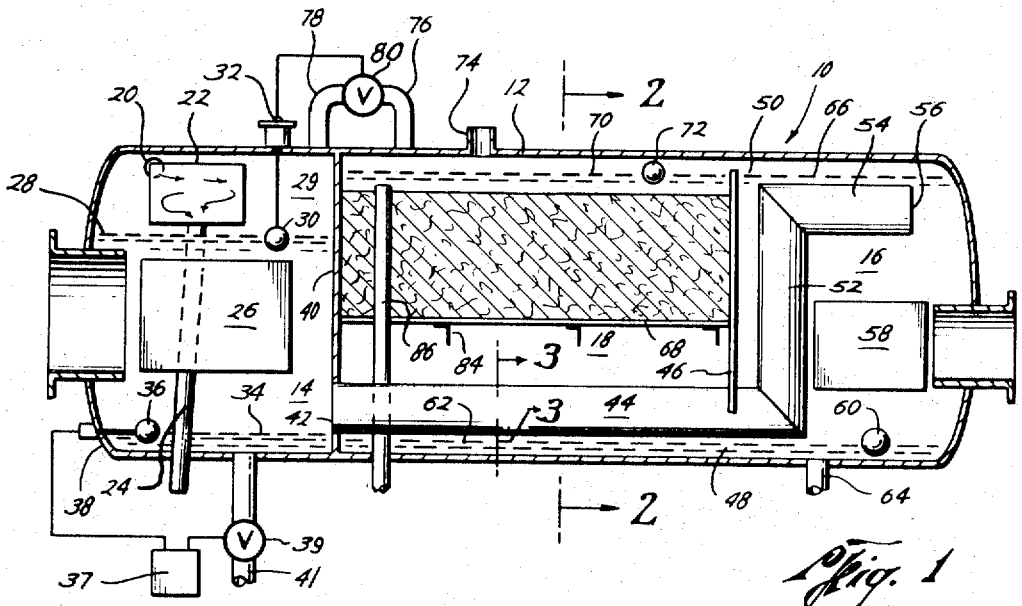

The present invention concerns liquid treatment methods and apparatus and more particularly relates to methods and apparatus for the separation of liquids and gasses contained in a mixture.

Numerous methods and pieces of equipment have been devised to separate liquids from each other and to separate any gas that may be entrapped in the liquids. Such apparatus and methods have wide application in many industries, one of which is the oil producing and processing industry which shall be used herein for purposes of discussion and explanation.

Oil taken from a well contains, generally speaking, free oil, free water, oil and water in an emulsion, and gas. In order to make the oil fit for processing, essentially all of the water and gas must be removed therefrom. The gas is, of course, processed separately for other purposes.

Removing the water from oil in quantities sufficient to purify the oil to an extent whereby it may be processed, has been a particularly vexing problem and various methods and apparatus have been devised for doing this. These prior devices and methods, however, suffer from certain disadvantages such as being limited in volume which may be treated in a set period of time due to the fact that the apparatus cannot satisfactorily separate the water from the oil. The present invention sets forth a method and apparatus which gives a significantly greater capacity in terms of volume of product that may be treated within a set period of time while providing substantially improved separation.

The present invnetion utilizes a treating vessel or tank containing compartments wherein the mixture is heated and filtered. It is well known that heating the mixture taken from a well aids in the coalescence of water droplets and in the settling out of these droplets. The water will settle to the bottoms due to the fact that it is heavier (having a specific gravity of 1.0) than oil (specific gravity of 0.5). It is, of course, necessary to prevent excessive turbulence or any such unnecessary disturbance of the liquids while they are being treated and conveyed from one compartment to another, since such turbulence or disturbance prevents the desired coalescence and settling and, in fact, causes a further mixing of the liquids.

The prevention of this undesirable turbulence and disturbance is achieved by the use of conveying means having a substantial size in all cross-sectional dimensions. Tubulence that is created by friction or contact of the mixture with the walls of the conveying apparatus is confined, for the most part, to a relatively thin layer adjacent the wall. Due to the sizeable cross-sectional areas in all dimensions of the fluid conveyed, there exists a large portion of the cross-sectional area that is not effected by the turbulence created adjacent the side walls. Accordingly, the coalescence and settling of the liquids in the mixture is not hindered while the mixture is being conveyed but is allowed to continue.

Furthermore, the mixture is accumulated in each of the compartments to a predetermined level to allow ample opportunity for the settling out of the heavier liquids and for the escape of gas. The accumulated mixture in the later stages of the separation treatment has, of course, already been heated, and the conveying apparatus extends beneath at least some of this previously heated accumulated liquid. By this arrangement, heat is transferred from the accumulated mixture to the mixture that is being conveyed. The conveying means also empties out beneath this accumulated mixture level to prevent any unnecessary disturbance.

The initial introduction into the tank is in the upper portion of the first compartment. Tubulence is produced at the point of introduction to allow as much gas as possible to be freed at this point. The introduction and turbulence at this relatively high level allows a substantial portion of the gas to escape so that, as it rises, does not pass through the mixture which is flowing generally downwardly.

Apparatus to remove the gas from the tank is utilized as well as apparatus to remove the heavier liquids that have settled out at the bottom of the tank. In addition, control apparatus utilizes the escaping gas to create a pressure differential between compartments when necessary to force the mixture to flow through the successive compartments.

It is, therefore, an object of the present invention to provide improved methods and apparatus for the separation of liquids and gas from a mixture thereof.

Another object of the present invention is to provide improved methods and apparatus for separating liquids and gas in a mixture, whereby turbulence and disturbance of the mixture during the separation is kept to a minimum.

A still further object of the present invention is to provide such methods and apparatus having inlet means for the mixture at a relatively high level to allow easy escape for entrapped gas.

Another object of the present invention is to provide such methods and apparatus employing as conveying means apparatus and methods which convey the mixture to successive treatment stages in such a manner as to have little disturbance throughout most of the mixture being conveyed, whereby coalescence and settling is not hindered.

A still further object of the present invention is to so arrange the apparatus that the conveying means is submersed in previously heated mixture whereby heat is transferred from the previously heated mixture to the mixture being conveyed thus resulting in greater heating efficiency.

An additional object is to provide for movement of the mixture in a generally downwardly direction during the heating stages to aid in the prevention of build-up of foreign matter on the heating surfaces.

Figure 2:
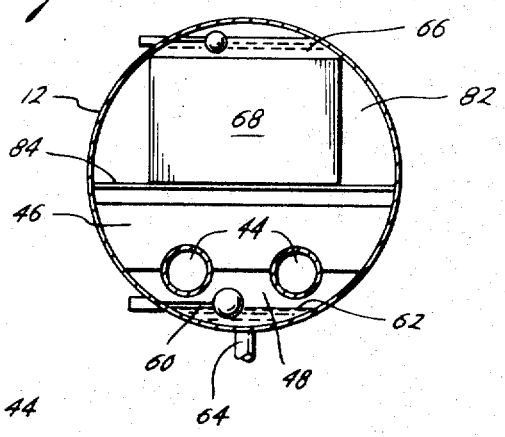
Figure 3:
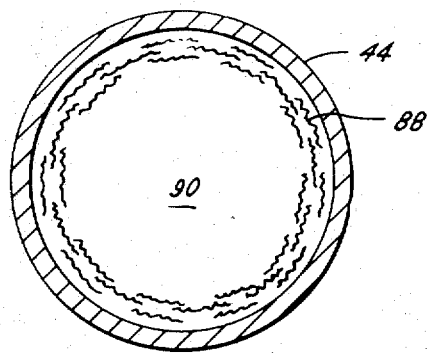

Other and further objects, features and advantages will be apparent from the following description of a presently preferred embodiment of the invention given for the purpose of disclosure, taken in conjunction with the accompanying drawings, wherein like character references designate like parts throughout the several views in where:

FIG. 1 is a side view of a preferred embodiment of the present invention taken in section and showing the levels of the liquids maintained therein, and FIG. 2 is an end view of the apparatus shown in FIGURE 1 and taken along section lines 2—2 of FIGURE 1, and FIGURE 3 is a section view of one of the fluid transfer pipes taken along section line 3—3.

Turning now to FIGURE 1, there is shown, in section, a treater generally indicated by the numeral 10. The treater is comprised of a vessel or tank 12 having generally three compartments, 14, 16 and 18.

The first compartment 14 has near the top thereof an inlet 20 through which the mixture of oil, gas and water is introduced into the treating vessel. The inlet means is connected to a cyclone separator 22 which is also located near the top of the compartment 14. As can be seen in FIGURE 1, the inlet is so positioned with respect to the cyclone 22 that the mixture is introduced into the cyclone along a path tangential to the cyclone. The cyclone has an open top, and, extending from the bottom thereof, is a downcomer pipe 24 to carry off heavy liquids which are separated due to the centrifugal action of the cyclone. Located in the central portion of the compartment 14 is a firebox 26 for heating the mixture as it moves through the compartment 14. As can be seen in FIGURE 1, a certain amount of the mixture is maintained in this first compartment and floating on the surface 28 of the mixture is the float member 30 of the liquid level control apparatus 32. The control apparatus 32 operates the valve 80 to open and close the gas outlet 78 as will be more fully explained below. An air space 29 exists at the top of the compartment. The water level in the first compartment is illustrated by the numeral 34, and floating on the interface of the mixture and the water is the float 36 of another liquid level control means 37. Control means 37 is operatively connected to the valve 39 for control of the water outlet 41.

The first compartment 14 is partially comprised of the end wall 38 of the vessel 12 and the transverse plate 40. Located near the bottom of the transverse plate 40, but above the water level 34, are two openings 42. Attached on the side of the plate 40 opposite the first compartment are fluid transfer pipes 44, these pipes communicating with the openings 42. Pipes 44 (only one of which is shown in FIGURE 1) extend through the third compartment 18 and through a second transverse plate 46. The transverse plate 46 has an opening 48 between its lowermost edge and the bottom of the vessel, and an opening 50 between its uppermost edge and the top of the vessel. After passing through the plate 46 and into the second compartment 16, the fluid transfer pipes 44 have a substantially vertically extending section 52 which extends to a point near the top of the vessel 12. Sections 52 then connect with horizontally extending portions 54. The ends 56 of the horizontal portions 54 are open, thus providing discharge means for the fluid conveyed through the pipes 44. Also located in the second compartment 16 is a second firebox 58 for additional heating of the mixture as it passes through the second compartment. A water level control float is indicated at 60 floating on the interface 62 of the water and the mixture in the second and third compartments 16 and 18. An outlet for this water is shown extending from the bottom of the vessel 12 and is indicated by the numeral 64. The level of the mixture maintained in the second compartment 16 is indicated at 66, and the discharge openings 56 are located below this level.

Turning now to the third compartment 18 which is defined by the side walls of the vessel 12 and the transverse plates 40 and 46, filter means 68 extends across the entire length and width of the compartment 18, whereby any mixture passing from the bottom to the top of the compartment must pass through the filter means. A predetermined level 70 of the mixture is maintained in the compartment 18 and floating thereon is the float 72 of an oil level control means which is not shown. Also located in the compartment 18 is an oil outlet 86 for the removal of the oil, the inlet end being located above the filter 63.

As can be seen in FIGURE 1, the level 70 of the oil in compartment 18 is equal to the level 66 of the mixture in compartment 16 due to the equality in vapor pressure above the liquids. The equal vapor pressure results from the opening 50 which allows the escaping gas to move between the second and third compartments.

Located in the top of compartment 18 is a gas outlet 74. Also located in the top of the compartment is a gas inlet 76 which is connected to the gas outlet 78 in the first compartment 14 by the valve 80. The valve 80 is operatively connected to and controlled by the liquid level control means 32 to establish a vapor pressure differential between the first compartment and the second and third compartments as will be explained.

Turning now to FIGURE 2, there is shown an end view of a section of the preferred embodiment of the treater, the view being taken along section line 2—2 of FIGURE 1. In this view the two fluid transfer pipes 44 are shown and the openings 48 and 50 between the transverse plate 46 and the top and bottom of the treating vessel 12 are more clearly shown. The filter means is mounted on the support brackets 82 by the horizontally extending members 84. Also shown is the float means 60 attached to the walls of the vessel 12 and floating on the surface 62 of the water that has settled on the bottom.

In FIGURE 3 there is shown a section view of one of the fluid transfer pipes taken along section lines 3—3. An area of turbulence in the transfer pipe 44 is indicated at 88. This turbulence is created by the action of the mixture being conveyed as it contacts the walls of the pipe and is restricted to a relatively thin layer which lies adjacent the walls as is shown. The remaining portion 90 of the cross-sectional area is essentially free of this turbulence and the mixture flows through this area in a relatively undisturbed manner.

Although the cross-section of the transfer pipe shown is circular, the transfer pipe may have some other cross-sectional configuration, for example, rectangular. A circular periphery is, however, preferable, since it contains less wall suface for a given cross-sectional area than any other configuration. The decrease in periphery results in a corresponding decrease in total turbulence created by contact with the sidewalls.

In the operation of the apparatus, the mixture of oil, gas and water is introduced through the inlet means 20 and into the cyclone 22. The mixture flows around the side walls of the cyclone and as a result of the centrifugal force, the heavier liquids, such as the free water, will move toward the bottom of the cyclone. It will move down the downcomer pipe 24 *and out* of the treating vessel. This initial elimination of the free water provides for a greater heating efficiency since no heat is absorbed by this water as would be the case should this water be allowed to flow through the compartment to settle out on the bottom.

Lighter liquids, such as the oil and the oil and water emulsion will flow over the top of the cyclone and into the first compartment 14. Because of the violent action of the mixture in the cyclone, a substantial amount of the gas will be released and will rise to the top of the compartment 14 and exit by means of the gas outlet 78 which is normally open. Since this released gas is already in the air space 29 at the top of the compartment 14, it will not pass through substantial amounts of the mixture in the compartment 14 where it could possibly become once again intermixed therewith and cause undesirable turbulence.

The mixture in the first compartment moves in a generally downwardly direction and is heated a predetermined amount by the firebox 26. It has been found that heating the oil and water mixture aids significantly in the coalescing of the water droplets and the subsequent settling out of the water from the oil. Water that is coalesced tends to settle out throughout the operation and a certain amount will settle on the bottom of the compartment 14, the level 34 being monitored by the float 36. When enough water has been settled out and the water level 34 reaches a predetermined level, the float 36 riding on the interface actuates the liquid level control means 37. This, in turn, opens valve 39, and allows the water to flow out of the treater vessel 12 and through outlet means 41.

After the mixture passes through compartment 14 where it receives a predetermined amount of heat from the firebox 26, it passes through the openings 42 in the transverse plate 40. The liquid or mixture is then conveyed through the fluid transfer pipes 44 to the discharge openings 56. The coalescence and settling continues in the pipes 44 due to the slight turbulence therein. Coming from the discharge openings 56, the mixture moves into the accumulated liquid in the compartment 16. Due to the location of the discharge openings below the mixture level 66, relatively little turbulence or disturbance is created by the introduction of additional mixture, as would be the case were the discharge end located above the mixture level 66, whereby the incoming mixture would be dumped onto the accumulated mixture.

Once again the movement of the mixture in the second compartment 16 is in a generally downwardly direction as was the case in the first compartment 14. The mixture is heated to a higher temperature by the firebox 58 to bring about further coalescence and settling out.

From the compartment 16, the mixture moves under the transverse plate 46 and through the opening 48 into the third or central compartment 18. Coalescing water accumulates in the bottom of the compartments 16 and 18. Due to the opening 48, only one water outlet 64 is necessary. This water outlet is controlled by the liquid level float 60 in conjunction with a liquid level control means (not shown) in the same manner as was the water outlet 41 in the first compartment 14.

As can be seen in FIG. 1, the fluid transfer pipes 44 extend through the central compartment 18 and are surrounded by the mixture moving into the compartment 18 and accumulating therein prior to passing through the filter 68. Accordingly, additional heat is transferred from this accumulated mixture in the compartment 18 to mixture traveling through the pipes 44. This results in a greater heating efficiency and a more even increase in the heating of the mixture as it is being treated.

At this point, essentially all of the water has been coalesced and settled out of the oil. As additional amounts of the mixture flow under the plate 46 and into the compartment 18, the mixture that is in the compartment is forced up through the filter 68. Ths filter may be comprised of any suitable substance and acts to separate the remaining water from the oil passing therethrough by causing the water to coalesce into droplets which move back down through the compartment 18 to the bottom of the tank 12. The oil, which by this time is quite pure, is forced out of the filter 68 and collects thereon, the level of this oil being indicated by the numeral 70. It then passes down the outlet means 86 in a controlled manner and continues on for storage or further processing.

Turning now to the gas removal apparatus which, in this embodiment, is located approximately over the plate 40. As stated previously, the action in the cyclone releases a substantial amount of gas from the mixture and it collects in the air space 29 in the compartment 14. Additional gas is released from the mixture while it is being treated in the vessel 12, this released gas rising to the surface in each compartment and collecting in the air space above the liquid surface. The gas collected in the air space 29 in compartment 14 in normal operation passes out of the gas outlet 78, through valve 80 and into compartment 18 through the pipes 76.

Gas escaping in compartments 16 and 18 will rise to the surface of the mixture and collect in the air space above the liquid levels 66 and 70 respectively. Because of the opening 50 in the transverse plate 46, the gas in compartments 16 and 18 can travel freely back and forth between the two compartments. This results in both compartments having the same vapor pressure, whereby the liquid mixture levels 66 and 70 are the same, as is shown. Once again in normal operation the gas collected in the compartments 16 and 18, as well as the gas entering compartment 18 from the pipe 76, exits through the gas outlet 74.

During some stages of the operation and under certain conditions, the flow of the mixture through the various compartments is not uniform and the mixture may tend to back up in the first compartment 14. Such an excessive accumulation of the mixture in compartment 14 results in the upward movement of the float 30. This movement actuates the control mechanism 32 and closes the valve 80, thus preventing the escape of gas from the compartment 14. Gas, however, continues to exit from the compartments 16 and 18 through the gas outlet 74. This results in a buildup of vapor pressure in the air space 29 of compartment 14, whereas the vapor pressure in the compartments 16 and 18 remain constant or possibly decrease. This vapor differential forces the liquid mixture to flow from the compartment 14, where the high vapor pressure is located and into the compartment 16. This influx of mixture into compartment 16, in turn, forces liquid into the compartment 18, through the filter 68 and out of the oil outlet 86. When the mixture level 28 in the first compartment 14 returns to its normal level, the float 30 actuates the control means 32 to reopen the valve 80 to allow the exit of the gas from the first compartment.

This embodiment of the present invention provides certain definite advantages over prior type devices. By introducing the mixture into the vessel 12 near the top of the first compartment 14, and immediately subjecting it to severe turbulence, substantial amounts of the gas contained in the mixture is thrown off and rises from the cyclone. Although the introduction of the mixture could be at the bottom of the first compartment, such an arrangement would require the gas to pass upwardly through all of the liquid accumulated in the first compartment which would result in additional mixing and further disturbance of the accumulated mixture. This disturbance would hinder the coalescing and settling action which the treatment is designed to bring about. Furthermore, the use of the cyclone causes the collapse of foam which is caused by the gas in the mixture.

The free water in the mixture is separated by the cyclone due to the fact that the specific gravity of water is 1.0 whereas the specific gravity of oil is 0.5. Thus, the heavier water would move to the bottom of the cyclone and be taken from the treating vesel by the downcomer pipe 24. This initial separation of the free water prevents any heat loss which would result if the water were allowed to remain in the mixture and pass down through the compartment 14, thereby relying on the subsequent settling out of this free water.

The downward flow of the free oil and the emulsion of oil and water in both compartments 14 and 16 also gives significant advantages. This downward flow of the mixture causes any sand, mud or other foreign material which is in the mixture as it is taken from the well to be washed off the heating surfaces. With an upward flow, such foreign mater would tend to collect on the upper surfaces of the firebox. The collection and sedimentation of such foreign matter would, in effect, insulate these heating surfaces, whereby the heat would not be dissipated. This could result in the temperatures of these surfaces rising to above 1200 degrees Fahrenheit. The severe thermal stresses would eventually result in the heating tubes cracking or in the collapse of the heating surfaces.

A certain amount of turbulence is desirable at this point to prevent this buildup of foreign matter on the heating surfaces. This turbulence is provided by the counter-current flow of the mixture against the flow of the gas escaping from the gas saturated oil accumulated in the compartments. This arrangement and the effect of the downward flow results in significant increases in fire tube life. As stated, however, in certain circumstances where other considerations weigh more heavily, the arrangement of the treater parts may be modified to give an upward flow.

The novel conveying means 44 utilized in the present invention contributes significantly to the improvements in the separating process achieved in the present invention. Prior methods of conveying the mixture created a sufficient amount of turbulence that the coalescence and settling was not only halted, but in some cases, further mixing took place, thereby undoing much of the separation that had already taken place. By utilizing conveying ducts of such a size that the major portion of the volume of the mixture passing through the duct is not disturbed by the turbulence created as the outermost part of the mixture moves against the walls of the ducts, the settling and coalescence continues. The layer of turbulence created in this manner is a relatively thin one, and although the part of the mixture not in this turbulent layer is not completely free of turbulence, it is sufficiently free to allow the coalescence and settling to continue. Of course, if the amount of wall surface can be decreased, the turbulent area will be decreased in a corresponding amount. It is for this reason that the circular cross-sectional area is preferred since it offers a smaller periphery per cross-sectional area than any other cross-sectional configuration. Furthermore, the additional heating obtained due to the fact that the fluid transfer ducts are submerged in previously heated mixture further aids in the promotion of water coalescence and settling. In summary, the present method and means of conveyance aids rather than hinders the separation of the liquids. By way of example, when compared to certain prior art type conveying means which are presently being utilized in similar treatment vessels, the increased efficiency of coalescence between the first and second compartments is shown by calculations which disclose that the present method of transfer resulted in a 30-fold decrease in Reynolds numbers which, of course, resulted in a 30-fold increase in the forces which tend to coalesce and settle out the water.

As an example of the improved results obtainable by the present invention, a treater built in accordance with the preferred embodiment disclosed herein was employed in parallel with a competing treater, both treaters being 10' x 37½'. Both were fed by means of a flow splitter and the flow rate of oil to each of the treaters was closely controlled at a rate of 1400 barrels per day. After three and one-half months of operation, the following performance data was reported. Water entrainment in the oil processed by the prior art type treater was 0.2 of 1%. This is the maximum entrainment allowable and accordingly, the maximum flow rate through the prior art type treater has been reached, i.e., 1400 barrels per day. The water entrained in the treated oil taken fram the treater which is the subject of the present invention was less than 0.05%. Obviously, significantly improved performance was achieved by the present invention. Furthermore, this water entrainment percentage, which was substantially below the maximum allowable, would permit an increase in the capacity of the treater. In all probability, this capacity could be increased to 1600 barrels per day and possibly to as much as 2000 barrels per day.

As can be seen, therefore, the present invention as disclosed in the preferred embodiment set forth herein is capable of achieving the objects set forth at the outset. A relatively simple and inexpensive apparatus has been devised which provides significantly improved results. The present invention is not only efficient but it is extremely reliable and economical. Methods and apparatus have been herein described which provide for the heating and separation of the oil, water and gas mixture with a minimum of unnncessary turbulence or disturbance of the mixture during the treating process. The present invention provides for a more uniform and gradual heating of the mixture that is being treated which also aids in the achievement of improved results. The present invention furthermore aids in the preservation of fire tube life as well as providing important increases in thermal transfer efficiency. It is also self regulating in that any backup of liquid within the vessel results in the establishment of a pressure differential which forces the flow of the mixture through the various compartments in the treater vessel.

The present invention, therefore, is well adapted to carry out the objects and obtain the ends and advantages mentioned as well as others inherent therein. While a presently preferred embodiment of the invention has been given for the purpose of disclosure, numerous changes in the detail of the construction and the combination, size, shape and arrangement of parts and uses may be resorted to without departing from the sphere and scope of the invention as hereinafter claimed.

What is claimed is:

1. Apparatus for separating liquids of varying densities from a mixture, including:

a vessel comprised of first, second and third compartments, heating means in the first and second compartments, an inlet located above the heating means in the first compartment, said inlet being partially comprised of, a cyclone having a substantially open top and a downcomer extending from the bottom of said cyclone, [out of the vessel,]

an outlet in the bottom of the vessel for removing heavier liquid that settles out in the first compartment, at least one fluid transfer duct extending from the first compartment and terminating in a discharge opening above the heating means in the second compartment, the duct having cross-sectional dimensions sufficiently large that a major portion of the mixture conveyed therethrough is sufficiently free of the turbulence adjacent the walls of the duct to prevent further intermixing, an opening extending between the second and third compartments near the bottom thereof, for movement of the mixture from the second to the third compartment, filtration means located in the third compartment above said opening, an outlet located above the filtration means in the third compartment for removal of the liquid that passes through the filtration means, an outlet in the bottom of one of said second or third compartments for removal of heavier liquids that settle out in said second or third compartments, predetermined levels of mixture being maintained in all of said compartments, the position of said transfer duct being further defined as having a major portion of its length submersed in mixture which has been previously heated by the heating means in the second compartment, and the discharge opening is located beneath the predetermined level maintained in the second compartment.

2. The invention of claim 1 wherein, the third compartment is located between the first and second compartments, the transfer duct extends through said third compartment and lies below the predetermined level maintained in the third compartment.

3. The invention of claim 2 and including, a first plate sealing the first compartment from the third compartment, a second plate separating the second compartment from the third compartment, said second plate terminating above the bottom of the vessel to define the opening for transfer of fluid between the second and third compartments, a second opening between the second and third compartments defined by the upper edge of the second plate terminating below the top of the vessel, said upper edge lying below the predetermined levels maintained in the second and third compartments.

4. The invention of claim 3 and including, a gas outlet in the top of the third compartment, a gas conduit extending from the top of the first compartment to the top of the third compartment for transfer of gas from the first to the third compartment, valve means in the conduit for opening and closing said conduit, level responsive means in said first compartment operatively connected to said valve means for operating said valve means in response to changes in said predetermined level.

5. Apparatus for separating liquids of varying densities from a mixture, including:

a vessel, having a first, second and third compartment, inlet means in said first compartment and near the top thereof, said inlet means including, a cyclone, wherein the mixture is subjected to centrifugal force resulting in initial separation of some of the heavier liquid, a downcomer pipe extending from the bottom of said cyclone [to the exterior of said vessel to remove] *for removing* the separated *heavier* liquid *from the cyclone to the bottom of said vessel,* said cyclone having an open top through which the remainder of the mixture passes, heating means in the first compartment for heating the mixture coming from the cyclone to a predetermined temperature as it passes through the first compartment, said downcomer pipe not being in heat exchange relation with the heating means, outlet means on the bottom of the vessel for the removal of heavier liquid that settles out in the first compartment, fluid transfer ducts for the transfer of the mixture to the second compartment, said ducts having a sufficiently large cross-sectional area in all dimensions that the layer of turbulence created adjacent the walls of the ducts by the contact of the mixture as it moves therethrough is but a small portion of the cross-sectional area, the remainder of the area being sufficiently free of said turbulence to allow the coalescence and settling to continue, said transfer ducts having inlet openings communicating with the first compartment near the bottom thereof for the intake of the mixture, whereby the movement of the mixture in the first compartment from the cyclone to the inlet openings is in a generally downwardly direction, said transfer ducts extending through the third compartment, heating means in the second compartment, discharge openings in said transfer ducts located above the heating means in the second compartment, an opening between the second and third compartments to allow the mixture to flow therebetween, said opening being located near the bottom of the two compartments, whereby the flow of the mixture in the second compartment is in a generally downwardly direction, a filter in said third compartment through which the mixture flows for final separation, means to remove the settled liquid from the bottom of the second and third compartments, and means to remove the mixture that passes through the filter, said mixture being accumulated to and maintained at predetermined levels in each of the compartments, the level in the second compartment being sufficiently high to cover the discharge openings and in the third compartment to cover the transfer ducts extending therethrough.

6. A method of separating liquids of varying densities from a mixture including the steps of:

initially separating some of the liquid by application of centrifugal force, carrying off this separated liquid, passing the remaining mixture downwardly in a first compartment over heating means for initial heating, carrying off from the bottom of the first compartment heavier liquids that have settled out, conveying the remaining mixture from the first compartment through conduit having cross-sectional dimensions sufficiently large that a major portion of the mixture being conveyed is sufficiently free of the turbulence that is created adjacent the walls of the conduit to prevent further intermixing, flowing the mixture downwardly in the second compartment over second heating means for further heating, flowing the mixture into a third compartment from beneath the second heating means, filtering the mixture in the third compartment, removing settled liquid from the bottom of the second and third compartments, removing mixture that passes through the filter, maintaining predetermined levels of mixture in the compartments, said conveying step being further defined as, conveying the mixture through heat conducting means which are surrounded by previously conveyed and previously heated mixture whereby heat is transferred from the surrounding mixture to the mixture being conveyed for greater heating efficiency, and introducing the mixture into the second compartment from beneath the predetermined level.

7. A method of separating liquids of varying densities from a mixture, including the steps of:

introducing the mixture into a first compartment of a separating vessel through a cyclone, separating some of the heavier liquid by the centrifugal force in the cyclone,

[removing directly from the vessel a portion of] *transferring directly to the bottom of the vessel* the separated heavier liquid, flowing the remaining mixture downwardly over heating means in the first compartment, whereby the mixture is heated to a predetermined temperature, transferring said heated mixture to a second compartment through at least one duct having a sufficiently large cross-sectional area in all dimensions that a major portion of said area is sufficiently free from turbulence that is created adjacent the walls of the duct by the contact of the mixture flowing therethrough to prevent further intermixing of the liquids in said major portion of the area, maintaining a predetermined level of mixture in the second compartment, introducing the mixture transferred into the second compartment beneath the level of mixture to prevent splashing of the mixture and resulting disturbance, flowing the mixture through the second compartment in a generally downwardly direction and over a second heating means whereby the mixture is heated to a higher temperature, passing the mixture into the third compartment, filtering the mixture in the third compartment to coalesce and settle out the remaining heavier liquids, removing the mixture that passes through the filter, removing from the bottom of the vessel in all three compartments the heavier liquid that has coalesced and settled out, and maintaining a level of mixture in said third compartment extending over the transfer duct whereby heat is transferred from the mixture in the third compartment to the mixture in the transfer duct.

References Cited

The following references, cited by the Examiner, are of record in the patented file of this patent or the original patent.

UNITED STATES PATENTS

| | | | |
|---|---|---|---|
| 1,915,436 | 6/1933 | Moore et al. | 55—169 |
| 2,681,150 | 6/1954 | Reid | 55—174 X |
| 2,726,729 | 12/1955 | Williams | 55—174 X |
| 2,783,854 | 3/1957 | Lovelady et al. | 55—174 |
| 3,009,536 | 11/1961 | Glasgow | 55—174 X |
| 3,029,580 | 4/1962 | Perry | 55—176 X |
| 3,040,499 | 6/1962 | May | 55—175 X |
| 3,312,044 | 4/1967 | McCarter | 55—174 X |

REUBEN FRIEDMAN, Primary Examiner

C. N. HART, Assistant Examiner

U.S. Cl. X.R.

55—175, 177; 210—72, 73, 180, 187